US012576824B2

(12) United States Patent
Beuss

(10) Patent No.: US 12,576,824 B2
(45) Date of Patent: Mar. 17, 2026

(54) BRAKE SYSTEM WITH AT LEAST TWO ENERGY SOURCES

(71) Applicant: Continental Automotive Technologies GmbH, Hannover (DE)

(72) Inventor: Jochen Beuss, Erzhausen (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 714 days.

(21) Appl. No.: 17/995,060

(22) PCT Filed: Mar. 26, 2021

(86) PCT No.: PCT/DE2021/200041
§ 371 (c)(1),
(2) Date: Sep. 29, 2022

(87) PCT Pub. No.: WO2021/197555
PCT Pub. Date: Oct. 7, 2021

(65) Prior Publication Data
US 2023/0125088 A1 Apr. 27, 2023

(30) Foreign Application Priority Data

Mar. 30, 2020 (DE) ..................... 10 2020 204 102.4

(51) Int. Cl.
*B60T 8/92* (2006.01)
*B60T 8/88* (2006.01)

(52) U.S. Cl.
CPC ................ *B60T 8/92* (2013.01); *B60T 8/885* (2013.01); *B60T 2270/402* (2013.01); *B60T 2270/403* (2013.01); *B60T 2270/414* (2013.01)

(58) Field of Classification Search
CPC ...... B60T 8/92; B60T 8/885; B60T 2270/402; B60T 2270/414; B60T 2270/403; B60T 13/741; B60T 17/221; B60Y 2400/81
See application file for complete search history.

(56) References Cited

U.S. PATENT DOCUMENTS

| | | |
|---|---|---|
| 5,961,190 A | 10/1999 | Brandmeier et al. |
| 6,189,981 B1 | 2/2001 | Niedermeier |
| (Continued) | | |

FOREIGN PATENT DOCUMENTS

| | | |
|---|---|---|
| CN | 101687498 A | 3/2010 |
| CN | 102164792 A | 8/2011 |
| (Continued) | | |

OTHER PUBLICATIONS

European Patent No. EP 1758778 to Lindqvist published on Feb. 29, 2012.*

(Continued)

*Primary Examiner* — Pamela Rodriguez

(57) ABSTRACT

A brake system has at least two energy sources and at least two electromechanical wheel brakes. A first wheel brake is directly connected exclusively to a first of the energy sources and is not directly connected to a second of the energy sources. A second wheel brake is directly connected to the second energy source and is not directly connected to the first energy source. The wheel brakes are each configured to, in the event of failure of the energy source of the respective other wheel brake, supply energy to the other wheel brake from the remaining energy source.

19 Claims, 7 Drawing Sheets

(56)                References Cited

U.S. PATENT DOCUMENTS

| | | | |
|---|---|---|---|
| 6,227,626 B1 | 5/2001 | Blattert | |
| 6,607,251 B2 | 8/2003 | Baumgartner et al. | |
| 12,168,431 B2 * | 12/2024 | Brenn .................. | B60T 17/221 |
| 2003/0030322 A1 * | 2/2003 | Yokoyama ............ | B60T 8/3255 |
| | | | 303/122.04 |
| 2005/0067888 A1 * | 3/2005 | Nilsson .................. | B60T 8/885 |
| | | | 303/20 |
| 2005/0116814 A1 | 6/2005 | Rogers et al. | |
| 2005/0200194 A1 | 9/2005 | Nilsson | |
| 2007/0024112 A1 * | 2/2007 | Lindqvist .............. | B60T 13/741 |
| | | | 303/122.04 |
| 2009/0234525 A1 | 9/2009 | Bourqui | |
| 2010/0241330 A1 | 9/2010 | Hartman et al. | |
| 2010/0314934 A1 | 12/2010 | Leiter | |
| 2011/0168502 A1 | 7/2011 | Linhoff et al. | |
| 2013/0282249 A1 | 10/2013 | Heise et al. | |
| 2017/0166173 A1 | 6/2017 | Auffer et al. | |
| 2020/0055506 A1 | 2/2020 | Michels et al. | |

FOREIGN PATENT DOCUMENTS

| | | |
|---|---|---|
| CN | 103167976 A | 6/2013 |
| CN | 107839678 A | 3/2018 |
| CN | 109624893 A | 4/2019 |
| CN | 109941253 A | 6/2019 |
| CN | 109952240 A | 6/2019 |
| CN | 110281896 A | 9/2019 |
| DE | 19529664 A1 | 2/1997 |
| DE | 19548392 A1 | 7/1997 |
| DE | 19732229 A1 | 3/1998 |
| DE | 19904721 A1 | 8/1999 |
| DE | 60102983 T2 | 9/2004 |
| DE | 102007059684 A1 | 6/2009 |
| DE | 102016123671 A1 | 6/2017 |
| DE | 102017210072 A1 | 12/2018 |
| EP | 1758778 A1 | 3/2007 |
| EP | 3339119 A1 | 6/2018 |
| WO | 2005110829 A1 | 11/2005 |

OTHER PUBLICATIONS

German Search Report dated Nov. 12, 2020 for the counterpart German Patent Application No. 10 2020 204 102.4.

The International Search Report and the Written Opinion of the International Searching Authority mailed on Jul. 5, 2021 for the counterpart PCT Application No. PCT/DE2021/200041.

Chinese Office Action dated Mar. 12, 2025 corresponding to Chinese Patent Application No. 202180019658.5.

Chinese Office Action date Apr. 25, 2024 for the counterpart Chinese Patent Application No. 202180019658.5 and machine translation of same.

European Examination Report date Jul. 17, 2024 for the counterpart European Patent Application No. 21 718 012.2 and machine translation of same.

Notice of Final Rejection dated Nov. 27, 2024 for the counterpart Korean Application No. 10-2022-7030822 and machine translation of same.

Chinese First Office Action dated Sep. 19, 2023 for the counterpart Chinese Patent Application No. 202180019658.5 and translation of same.

Request for the Submission of an Opinion dated Mar. 28, 2024 for the counterpart Korean Application No. 10-2022-7030822 and machine translation of same.

CNIPA Notification of Allowance dated May 22, 2025 for the counterpart Chinese Patent Application No. 202180019658.5 and machine translation of same.

* cited by examiner

BRAKE SYSTEM WITH AT LEAST TWO ENERGY SOURCES

CROSS-REFERENCE TO RELATED APPLICATIONS

The present application is a National Stage Application under 35 U.S.C. § 371 of International Patent Application No. PCT/DE2021/200041 filed on Mar. 26, 2021, and claims priority from German Patent Application No. 10 2020 204 102.4 filed on Mar. 30, 2020, in the German Patent and Trademark Office, the disclosures of which are herein incorporated by reference in their entireties.

TECHNICAL FIELD

The invention relates to a brake system for a motor vehicle.

BACKGROUND

Brake systems may have at least two energy sources and at least two, in particular four, electromechanical wheel brakes. Having electromechanical wheel brakes that are directly connected in each case only to one of the energy sources but not both energy sources, are known. Such a brake system is schematically illustrated by way of example in FIG. 1.

Here, the brake system 10 illustrated in FIG. 1 has a pedal actuation unit 102 which is composed substantially of a pedal feel simulator and which serves for determining a corresponding actuation signal in the event of actuation by a vehicle driver. The brake system 10 furthermore has two electronic control units 104 and 106 which are connected to the pedal actuation unit 102 and which are configured to, on the basis of an actuation signal received from the pedal actuation unit 102, generate control commands that are suitable for the activation of the wheel brakes 108, 110, 112 and 114. For the transmission of such control commands to the wheel brakes 108, 110, 112 and 114, the electronic control units 104 and 106 are connected to the wheel brakes 108, 110, 112 and 114 via corresponding cable connections. Here, in each case two wheel brakes are connected to a single control unit, resulting in two mutually independently controlled brake circuits. In the example illustrated, by way of example, the control unit 104 is connected to the front left wheel brake 108 and to the rear right wheel brake 114, whereas the control unit 106 is connected to the front right wheel brake 110 and to the rear left wheel brake 112.

For the supply of energy both to the control units 104 and 106 and to the wheel brakes 108, 110, 112 and 114, the brake system 10 has two energy sources 116 and 118, for example in the form of corresponding batteries. Such an energy source may however equally also be interpreted as representing an on-board electrical system of the vehicle. Here, the first battery 116 is directly connected exclusively to the control unit 106, and to the front right wheel brake 110 and to the rear left wheel brake 112. The second battery 118 is in turn directly connected to the control unit 104, and to the front left wheel brake 108 and to the rear right wheel brake 114. There is no direct connection for example of the rear right wheel brake 114 to the first battery 116. Here, the wheel brakes 108, 110, 112 and 114 are each configured as electromechanical wheel brakes and have in each case one independent control unit 120, 122, 124 and 126, which control units regulate the behavior of the respective wheel brake on the basis of received control commands.

There are accordingly two independent brake circuits which comprise in each case one energy source, one control unit and two wheel brakes, which in this case are distributed diagonally.

For highly automated driving in such a brake-by-wire brake system, it is necessary here that the braking that is controlled by the driver remains possible in the event of any form of failure. This also applies in particular to faults in the electronics, in particular with regard to the supply of energy by the energy sources. A prerequisite for this is a redundant concept for the energy supply in the vehicle, in the case of which a connection of the two on-board electrical systems of the vehicle must fundamentally be avoided. There would otherwise be the risk that, in the event of a short circuit, both on-board electrical systems would be disabled simultaneously. Braking would then no longer be possible.

This underlying concept is implemented in the brake system 10 illustrated in FIG. 1 by way of the separate brake circuits with their independent energy supply and control. Thus, in the event of a failure of one of the energy sources or of one of the control units, there would always still be one available further brake circuit with two wheel brakes, by means of which a braking demand could be implemented. However, if the effective brake system is reduced to only two functioning wheel brakes, the available deceleration performance is in some cases reduced to such an extent that it no longer satisfies the necessary safety requirements.

There is consequently a demand for a concept with which, even in the event of failure of one of the energy sources or of one of the control units, sufficiently high deceleration performance remains available, such that safe deceleration of the vehicle is ensured.

SUMMARY

In the case of a brake system having at least two energy sources and having at least two electromechanical wheel brakes, wherein a first wheel brake is directly connected exclusively to a first of the energy sources and is not directly connected to a second of the energy sources, and a second wheel brake is directly connected to the second energy source and is not directly connected to the first energy source, provision is made whereby the wheel brakes are each configured to, in the event of failure of the energy source of the respective other wheel brake, supply energy to the other wheel brake from the remaining energy source.

A "direct connection" between wheel brake and energy source may be understood to mean a connection in which no further assemblies or devices are connected between the wheel brake and the energy source. Consequently, there is no longer a "direct connection" if at least one device, for example a further wheel brake, is situated in the connection between the wheel brake under consideration and the associated energy source. An "energy source" may be understood to mean for example a battery or an on-board electrical system of the vehicle.

A failure of one of the energy sources may be compensated by virtue of the wheel brake that is directly affected by the failure also continuing to be supplied with energy from the energy source that still remains, such that at least the deceleration performance of the wheel brake connected to the unaffected wheel brake is maintained. The transmission of energy between the wheel brakes is may be controlled by the control units of the wheel brakes. The control units of the wheel brakes may for example also be configured to, if a failure of an energy source is identified, output a corresponding warning message that indicates to the vehicle driver, for example visually or acoustically, that a malfunction of the brake system has occurred.

In order to ensure a reliable transmission of energy between the wheel brakes, it is provided in one embodiment that for each of the wheel brakes there is provided a power regulating unit which is configured to, in the event of failure of that energy source which is not connected to the wheel brake, control the transmission of energy from the remaining energy source to the respective other wheel brake. The power regulating unit may for example be configured as part of the control unit of a wheel brake and serve, inter alia, in the event of a failure of a wheel brake being identified, to isolate the corresponding wheel brake from the failed energy source such that, for example, a short circuit that has arisen as a result of a defect does not have any adverse effect on the other wheel brakes. Provision is made whereby a power regulating unit is formed in a control unit only if the control unit is connected to a further control unit of another wheel brake for the transmission of energy.

According to a further embodiment, it is ensured that a wheel brake affected by a failure of an energy source is supplied with energy by the unaffected wheel brake in as efficient a manner as possible in that the first wheel brake and the second wheel brake are directly connected to one another via at least one connecting line for the transmission of energy from the respective energy sources. The connecting line may for example be charged only if one of the energy sources has failed. Furthermore, provision may be made whereby the power regulating unit and/or the control unit of a wheel brake cyclically checks the availability of the direct connecting line and, if necessary, outputs a warning if there is no longer availability.

According to a further embodiment, f the first wheel brake and the second wheel brake may be directly connected to one another by means of two connecting lines for the transmission of energy from the respective energy sources, wherein a first of the connecting lines is configured exclusively to transmit energy from the first wheel brake to the second wheel brake and wherein a second of the connecting lines is configured exclusively to transmit energy from the second wheel brake to the first wheel brake. Accordingly, the connecting lines each constitute unidirectional connections, which each allow a transmission of energy only in a single direction. In this way, the energy transmission paths do not influence one another.

According to a further embodiment, provision is furthermore made whereby the wheel brakes have in each case one first interface for connection to the respective energy source and one second interface for connection to the respective other wheel brake. The interfaces may each be formed as part of the control units of the wheel brakes. The interfaces may be configured such that they do not influence one another, for example are configured as separate plug-type connections. The interfaces are may be configured such that an existing connection to an energy source or to the respective other wheel brake can be shut off in targeted fashion. It is thus possible for example, in the event of a defect of the energy supply or of the other wheel brake, to prevent said defect from having a direct effect on the wheel brake under consideration. For example, in the event of a fault, a defect of the respective other wheel brake or of the energy source could also, as a consequential fault, lead to a failure of the wheel brake under consideration.

According to a further embodiment, in order to improve a galvanic isolation of the wheel brakes from the energy sources and also between the wheel brakes themselves, provision is made whereby the wheel brakes are connected via in each case one DC converter per interface to the energy source and/or to the respective other wheel brake. Consequently, there may be in each case one DC converter provided at the interfaces between energy source and wheel brake and between wheel brake and wheel brake.

Furthermore, according to a further embodiment, reliable and targeted coupling and decoupling between wheel brakes and energy sources can be achieved by virtue of the interfaces to the energy source and/or to the respective other wheel brake being connected separably to the wheel brake via switching devices. It is thus possible, for example, for the connection between a wheel brake and a faulty energy source to be shut off in targeted fashion by way of the interface, such that the rest of the brake system is not influenced by the faulty energy source. The switching devices may be controlled by the power regulating unit or the control unit of a wheel brake. The switching devices may for example be configured as safety switches.

Further, provision may also be made whereby the interface between wheel brake and energy source has a switching device, whereas the interface to the respective other wheel brake has a DC converter, or vice versa.

According to a further embodiment, provision is furthermore made whereby the brake system has two brake circuits with, in each case, at least two wheel brakes per brake circuit, wherein at least one wheel brake of a first of the brake circuits is directly connected to at least one wheel brake of a second of the brake circuits for the supply of energy in the event of failure of one of the energy sources. Taking the example of a vehicle with two axles, provision may be made whereby the direct connection exists between the wheel brakes of a front axle of the vehicle, between the wheel brakes of a rear axle of the vehicle, between the wheel brakes of in each case one side of the vehicle, or between diagonally oppositely situated wheel brakes of the vehicle.

According to a further embodiment, in the above-described configuration with two brake circuits, provision is made whereby the brake circuits have in each case one central control unit for providing control information items for the wheel brakes, wherein in each case at least one of the wheel brakes of one brake circuit is configured to, in the event of failure of the control unit of the brake circuit, receive and process control information items from a wheel brake of the other brake circuit. For this purpose, a separate bus system may be configured between the control units of the wheel brakes, which separate bus system is separate from the direct connection of the wheel brakes for the exchange of energy. In this way, even in the event of failure of one of the control units of a brake circuit, brake regulating functions that are reliant on corresponding control signals of the control unit, such as ABS regulation operations, can continue to be performed.

According to a further embodiment, the transmission of energy between the wheel brakes can be provided in that the brake system has at least one energy transmission unit which is directly connected in each case to the first and to the second wheel brake and which is configured to, in the event of failure of one of the energy sources, control the supply of energy to the affected wheel brake by the energy source of the respective other wheel brake. The energy transmission unit is accordingly for example arranged in the direct connection between the wheel brakes. Through the use of a separate unit for controlling the transmission of energy between the wheel brakes, a power regulating unit in the wheel brakes, which may intrinsically be provided for the control of the transmission of energy between the wheel brakes, can be either made simpler or even omitted entirely. Voltage for the operation of the energy transmission unit may be supplied to the energy transmission unit exclusively by the wheel brakes, such that no direct connection of the energy transmission unit to one of the on-board electrical systems of the vehicle is necessary. The energy transmission unit may be configured such that it remains in an energy-saving standby state for as long as no failure of one of the energy sources has occurred. The energy transmission unit may be likewise configured such that, even in the event of an undervoltage of both energy sources, said energy transmission unit remains in the standby state so as not to place an additional burden on the on-board electrical systems.

According to a further embodiment, provision is made whereby the energy transmission unit is connected via a first interface to the first wheel brake and via a second interface to the second wheel brake, wherein the energy transmission unit is configured to identify a voltage drop at one of the interfaces and, in reaction to an identified voltage drop, hold the voltage at the corresponding interface at least at a minimum voltage.

The energy transmission unit may be configured such that the control of the voltages prevailing at the interfaces by the energy transmission unit is performed exclusively on the basis of the voltage provided at the interfaces by the wheel brakes. Further control signals may not be required. For this purpose, it is for example possible for pulse width modulation generators (PWM) to be used by means of which, within the energy transmission unit, a voltage provided at an interface is regulated solely on the basis of the voltages prevailing at the interfaces and current intensities derived from the voltages.

According to a further embodiment the first interface may be spatially separate from the second interface, such that the interfaces do not influence one another for example in the event of a defect of one of the interfaces, such as in the event of uncontrollable mechanical damage. For example, the two interfaces may be spatially separate plug-type connections. Defects or mechanical damage refer for example to malfunctions which result in intrinsically separate contacts making undesired electrical contact. For example, such behavior may occur as a result of melting or burning of one of the contacts.

Aside from the connectors of the energy transmission unit for the provision of a voltage from or to the wheel brakes, the energy transmission unit may furthermore have two ground connectors, which may coincide with the respective plug-type connections to the wheel brakes.

According to a further embodiment, provision is furthermore made whereby the energy transmission unit has a first electrical circuit for providing a voltage at the first interface and a second electrical circuit for providing a voltage at the second interface, wherein the first electrical circuit is galvanically isolated from the second electrical circuit. In this way, it is possible to avoid a situation in which, for example, a short circuit of a faulty energy source has an effect on that brake circuit which is not directly connected to the faulty energy source.

According to a further embodiment, provision is made whereby the electrical circuits are, in the event of failure of one of the energy sources, supplied with a voltage in each case from the respective other electrical circuit. For this purpose, for example in the energy transmission unit, a transformer may be provided, for example having a ferrite core, by means of which a voltage prevailing at the first interface and consequently in the first electrical circuit can be transmitted to the second electrical circuit. The voltage provided at the interface of the second electrical circuit on the basis of the voltage thus provided may then be controlled, on the basis of the voltages and currents prevailing in the electrical circuits, by means of a PWM generator of the energy transmission unit, which PWM generator is arranged in the second electrical circuit.

According to a further embodiment, in order to avoid an overload of one of the energy sources in the event of failure of the other energy source, provision is made whereby the energy transmission unit is configured to, in the event of failure of one of the energy sources, supply energy at most with a defined power to that wheel brake which is affected by the failure. The limitation may be implemented by means of a correspondingly configured PWM generator of the energy transmission unit. The transmitted power may be regulated on the basis of the corresponding electrical current, which simplifies the measurement of the transmitted power.

BRIEF DESCRIPTION OF THE DRAWINGS

The present disclosure will become more fully understood from the detailed description and the accompanying drawings, wherein.

DETAILED DESCRIPTION

In the following text, features that are similar or identical are denoted by the same reference designations.

Figure 1:
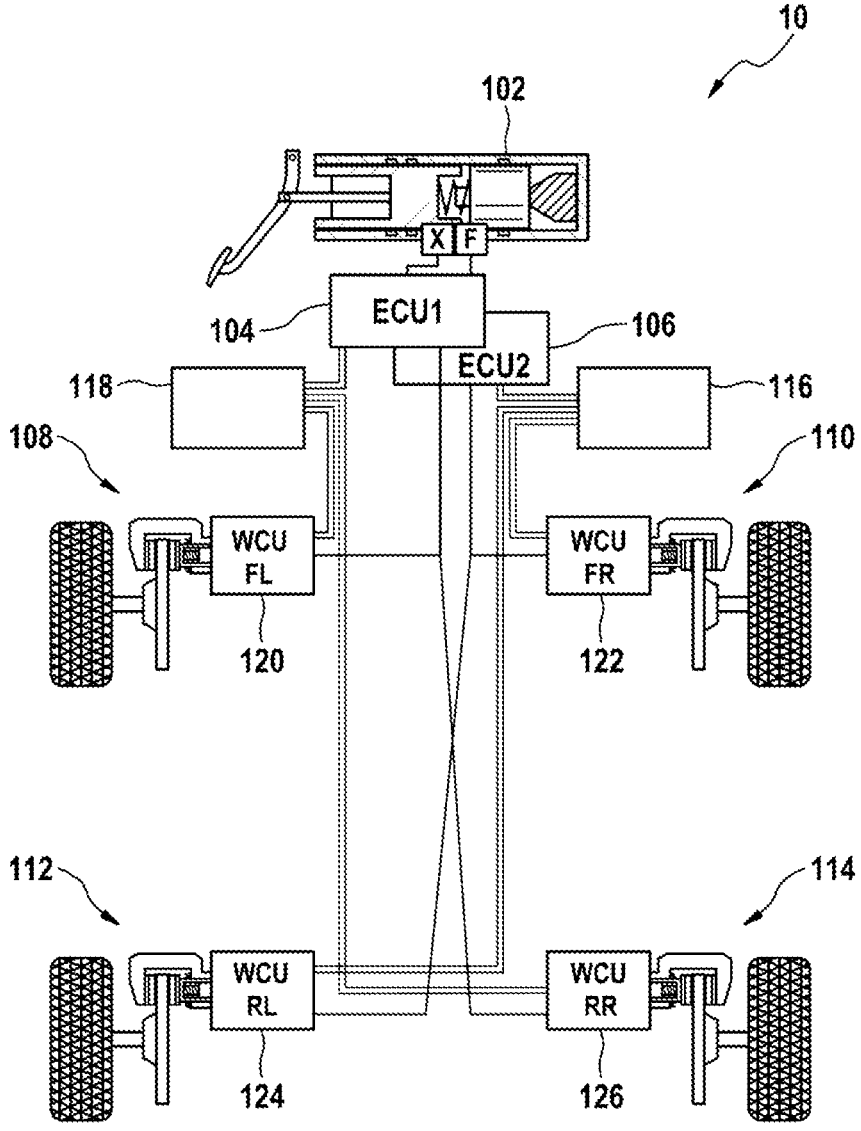
FIG. 1 shows a schematic illustration of an exemplary brake system of the prior art.
Figure 2:
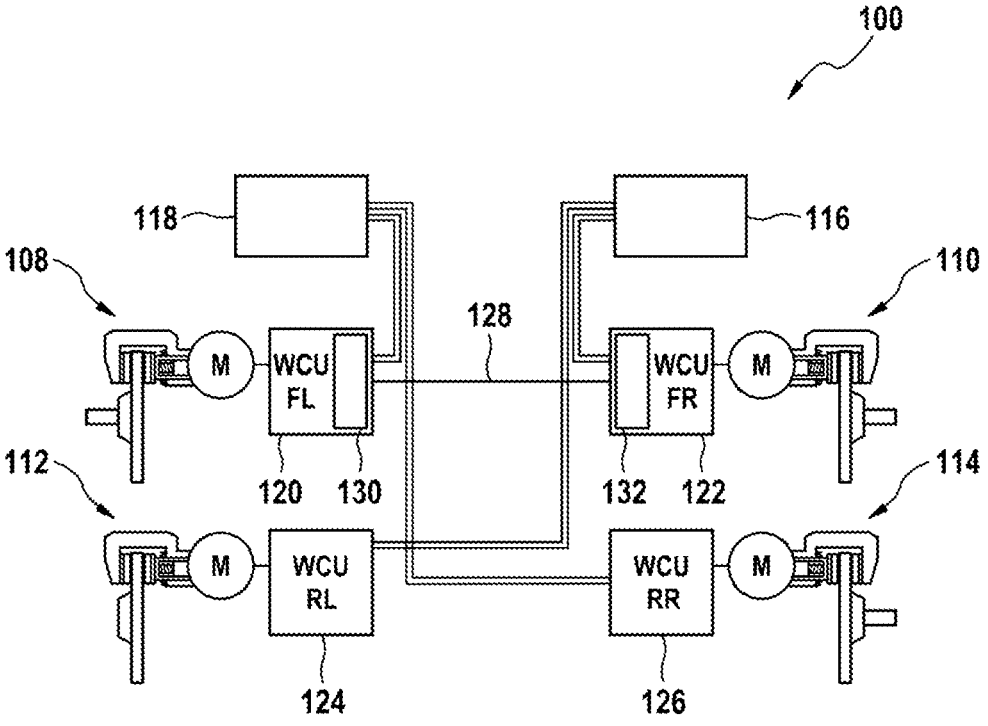
FIG. 2 shows a schematic illustration of an exemplary brake system with four wheel brakes, two of which are connected to one another for the mutual supply of energy.

FIG. 2 shows a schematic illustration of a brake system 100 that largely corresponds to the brake system 10 described above with regard to FIG. 1. For the sake of clarity, however, the pedal actuation unit 102, the control units 104 and 106, and the wheels arranged at the wheel brakes 108, 110, 112 and 114, are not illustrated again in FIG. 2.

By contrast to the brake system 10 illustrated in FIG. 1, it is provided in the brake system 100 of FIG. 2 that the front left wheel brake 108 and the front right wheel brake 110 are connected to one another via a connecting line 128 such that, in the event of failure of one of the energy sources 116 or 118, the supply of energy to the respectively affected wheel brake can be provided by that wheel brake which is not affected by the failure.

To control the transmission of energy in the event of a failure of one of the energy sources 116 or 118, power regulating units 130 and 132, respectively, are formed in each of the control units 120 and 122, respectively, of the wheel brakes 108 and 110, respectively. The power regulating units 130 and 132, respectively, are for example designed to identify a failure of one of the energy sources 116 or 118 and, in response thereto, to shut off the connection between the affected wheel brake and the failed energy source and to draw the energy required for the operation of the affected wheel brake from the unaffected wheel brake.

The connection illustrated in FIG. 2 between the front left wheel brake 108 and the front right wheel brake 110 is in this case merely an example of how an at least partial redundancy can be created for the event of a failure of one of the energy sources 116 or 118. For example, in the event of a failure of the energy source 116 and of an energy supply of the wheel brake 110 that results from this, the remaining available braking performance of the brake system 100 would, by means of the wheel brake 108, be considerably improved in relation to the braking performance that would be available in the event of failure of both wheel brakes 112 and 110, because three out of four wheel brakes can continue to be operated.

However, it may also be possible for the rear left brake 112 to be connected to the rear right brake 114 via a corresponding connecting line for the exchange of energy. It would likewise also be possible for the wheel brakes of one side to be connected, that is to say for the wheel brake 108 to be connected to the wheel brake 112, or for the wheel brake 110 to be connected to the wheel brake 114, for an exchange of energy. It would furthermore also be possible for in each case more than 2 wheel brakes to be connected to one another for the exchange of energy. For example, it would accordingly also be possible, aside from a connection between the front left wheel brake 108 and the front right wheel brake 110, for a further connection to be provided between the rear left wheel brake 112 and the rear right wheel brake 114. The variant in which the front wheel brakes 108 and 110 can mutually compensate a failure of the respectively associated energy sources 116 and 118 may correspond to situations where it is commonly the case that a major part of the deceleration performance during a deceleration of the vehicle is imparted by the wheel brakes of the front axle.

Below, different exemplary variants of connection configurations of energy sources and control units of the wheel brakes will now be described with reference to FIGS. 3 and 4 on the basis of corresponding schematic illustrations. Purely by way of example, it is assumed that the control unit shown on the left is the control unit 120 of the front left wheel brake 108, and the control unit shown on the right is the control unit 122 of the front right wheel brake 110. The two energy sources 116 and 118 shown may for example be batteries or the on-board electrical system of a vehicle in which the brake system 100 is used.

The control units 120 and 122 may be of substantially identical construction and each comprise a microcontroller 134 and 136, respectively, which is for example configured for activating the wheel brake 108 in order to implement a braking demand. Furthermore, the control units 120 and 122 each have a power regulating unit 130 and 132, respectively, which is configured to, in the event of a failure of an energy source associated with the wheel brake, control the supply of energy by that wheel brake which is not affected by the failure. For this purpose, the power regulating unit 130 of the control unit 120 is for example connected via a first interface 138 to the energy source 118, whereas a connection to the control unit 122 of the front right wheel brake 110 exists via a second interface 140.

Analogously to this, the control unit 122 of the front right wheel brake 110 likewise has a first interface 142 for connection to the energy source 116 and a second interface 144 for connection to the control unit 120. Furthermore, the two control units 120 and 122 have in each case one data bus 146 and 148 via which, for example, control information items for the activation of the wheel brakes can be exchanged.

Figure 3:
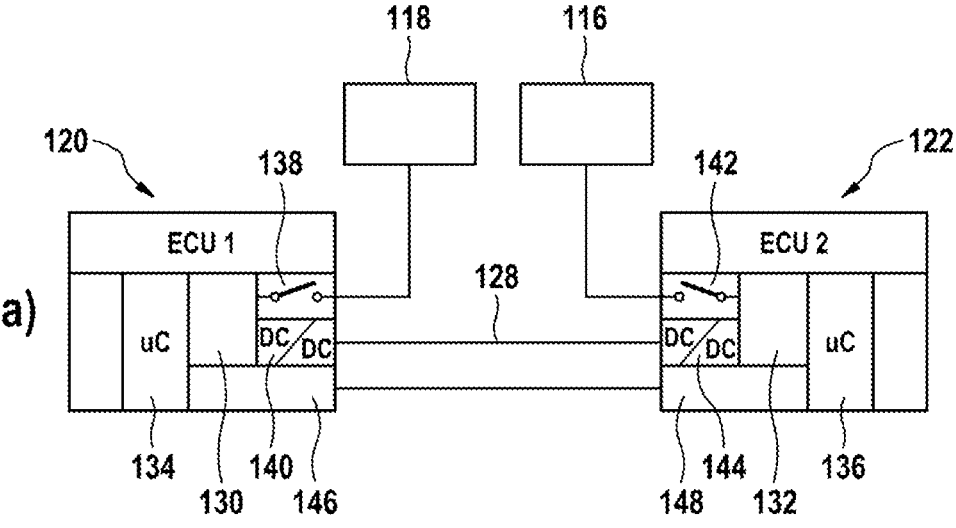
FIG. 3 shows schematic illustrations of exemplary connection configurations of energy sources and control units of the wheel brakes.
Figure 3:
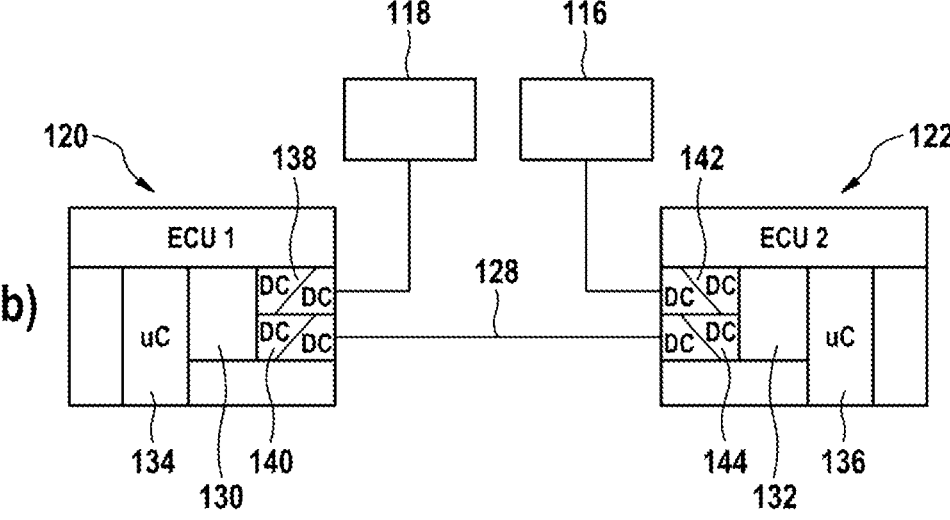

In the variant illustrated in FIG. 3 *a*), the first interfaces 138 and 142 of the control units 120 and 122 each have switching units configured as safety switches, such that the connection between the control units 120, 122 and the respectively associated energy sources 116 and 118 can be shut off in the event of failure of one of the energy sources. The in each case second interfaces 140 and 144 of the control units 120 and 122 each have DC converters, by means of which a galvanic isolation of the control units 120 and 122 is realized.

During the normal operation of the illustrated brake system 100, that is to say the normal functioning of the energy sources 116 and 118, the safety switches of the interfaces 138 and 142 are closed, such that the control units 120 and 122 are in each case supplied with energy from the associated energy sources 116 and 118. No energy is transmitted via the connecting line 128. The control units 120 and 122 or the associated power regulating units 130 and 132 may in this case be configured to cyclically check the availability of the connecting line 128 and, if necessary, output a fault message if the connecting line 128 is nonfunctional.

If, for example, the energy source 116 now fails owing to a short circuit or some other defect, this is identified by the power regulating unit 132, and the safety switch of the interface 142 is opened. The energy required for the operation of the wheel brake 110 is drawn from the wheel brake 108, or directly from the energy source 118, via the connecting line 128. The regulation of the transmission of energy by the power regulating units 130 and 102 30 is for example configured such that an uninterrupted transfer to the supply of energy by the wheel brake 108 is ensured. At the same time, overload protection can also be implemented by means of the described infrastructure. If, for example, a short circuit arises at the connecting line 128, this can also be identified on the basis of an overload detection by the power regulating units 130 and 132, such that the DC converters of the interfaces 140 and 144 are deactivated in order to avoid influencing of the control units 120 and 122 by the identified short circuit.

In the variant illustrated in FIG. 3 *b*), the safety switches of the first interfaces 138 and 142 of the control units 120 and 122 are replaced by DC converters. The use of DC converters on both interfaces further reduces the likelihood of galvanic coupling between control unit 120 and energy source 118, or control unit 122 and energy source 116, respectively, in the event of a fault.

Figure 4:
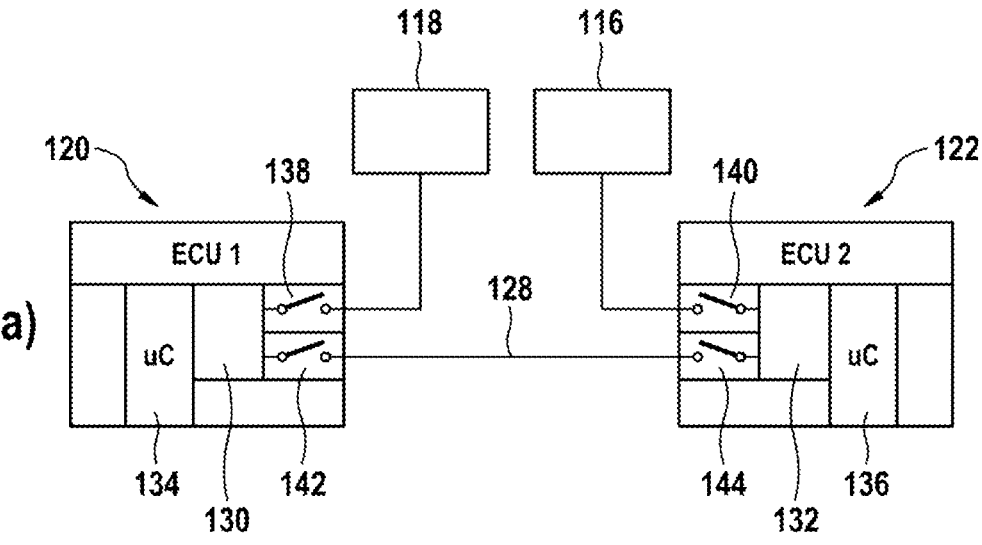
FIG. 4 shows schematic illustrations of further exemplary connection configurations of energy sources and control units of the wheel brakes.
Figure 4:
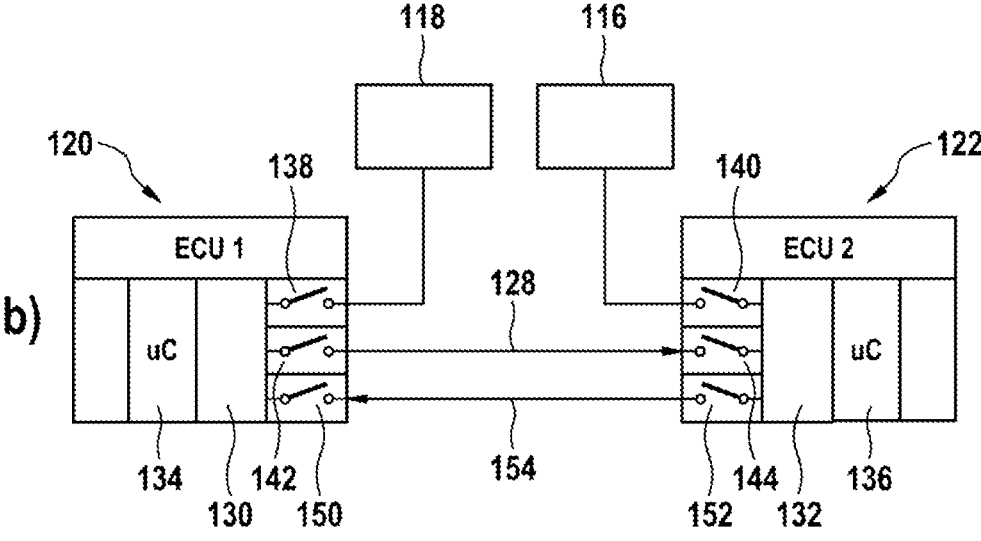

By contrast, in the variant illustrated in FIG. 4 *a*), both the first interfaces 138 and 142 and the second interfaces 140 and 144 of the control units 120 and 122 are each equipped with a safety switch, wherein the safety switches may be actuated by the power regulating unit 130 and 132.

In the variant illustrated in FIG. 4 *b*), the control units 120 and 122 furthermore have in each case one third interface 150 and 152, respectively, via which the control units 120 and 122 are likewise connected to one another for the exchange of energy. In the illustrated embodiment, all interfaces of the control units 120 and 122 are each equipped with safety switches, by means of which corresponding connections can be shut off if necessary. The connecting line 128 between the in each case second interfaces 140 and 144 is configured exclusively to transmit energy from the first control unit 120 to the second control unit 122, whereas the further connecting line 154 between in each case third interfaces 150 and 152 is configured exclusively to transmit energy from the second control unit 122 to the first control unit 120. Consequently, in this variant, the connecting lines 128 and 154 are in each case unidirectional connections, such that the directional paths between the control units 120 and 122 are in each case separate.

Figure 5:
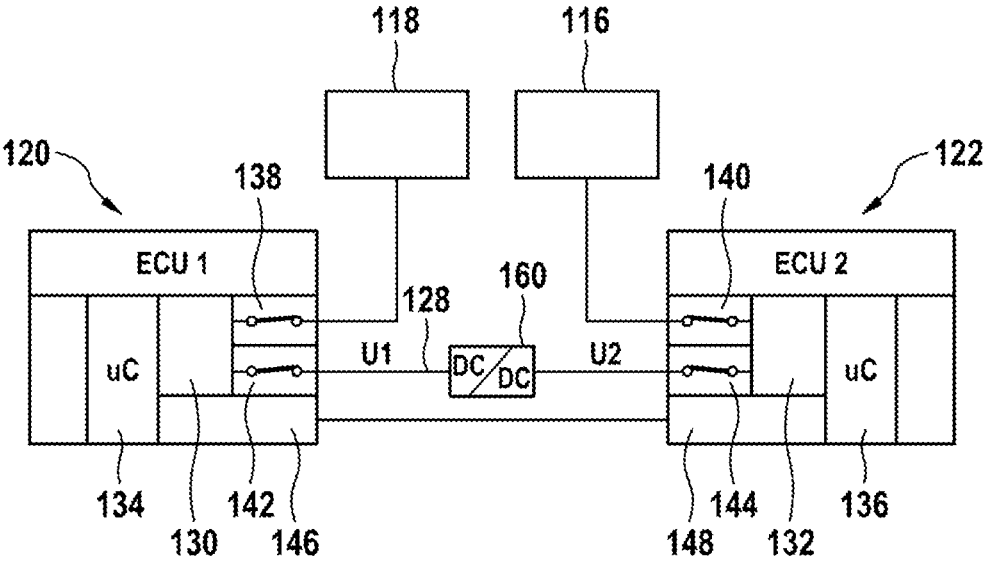
FIG. 5 shows a schematic illustration of an exemplary connection configuration of energy sources, control units of the wheel brakes and an energy transmission unit.

FIG. 5 shows a further embodiment of the variants of connection configurations of the control units 120 and 122 and of the energy sources 116 and 118 as described above with reference to FIG. 3 and FIG. 4. In the variant illustrated here, which substantially corresponds to the variant of FIG. 4 *a*), an energy transmission unit 160 is arranged in the connecting line 128 between the respective second interfaces 140 and 144 of the control units 120 and 122. The energy transmission unit 160 is configured to control the exchange of energy between the control units 120 and 122 or the wheel brakes 108 and 110 on the basis of the voltages U1 and U2 provided at the interfaces 142 and 144.

The functioning of the energy transmission unit 160 will now be described below with reference to FIG. 6, which illustrates two variants of electrical circuits with which an energy transmission unit 160 can be implemented. The illustrated variants of the energy transmission unit may be configured as independent control units in a separate housing, wherein the energy transmission unit may have only four connectors. The connectors serve for the provision of the voltages U1 and U2 from the second interfaces 142 and 144 of the control units 120 and 122 and from two independent ground connectors (GND1, GND2). In each case one voltage (U1 or U2) and in each case one ground (GND1, GND2) may be combined in one plug connector 166 or 168, respectively, wherein the resulting two plug connectors 166 and 168 and the corresponding interfaces of the energy transmission unit 160 may be spatially separate from one another.

Figure 6:
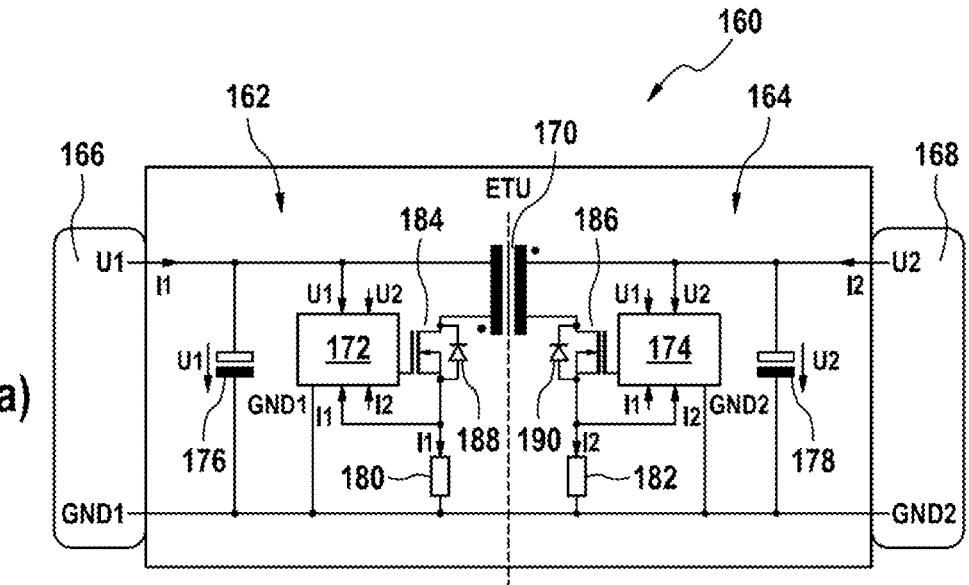
FIG. 6 shows schematic illustrations of electrical circuits of exemplary energy transmission units.
Figure 6:
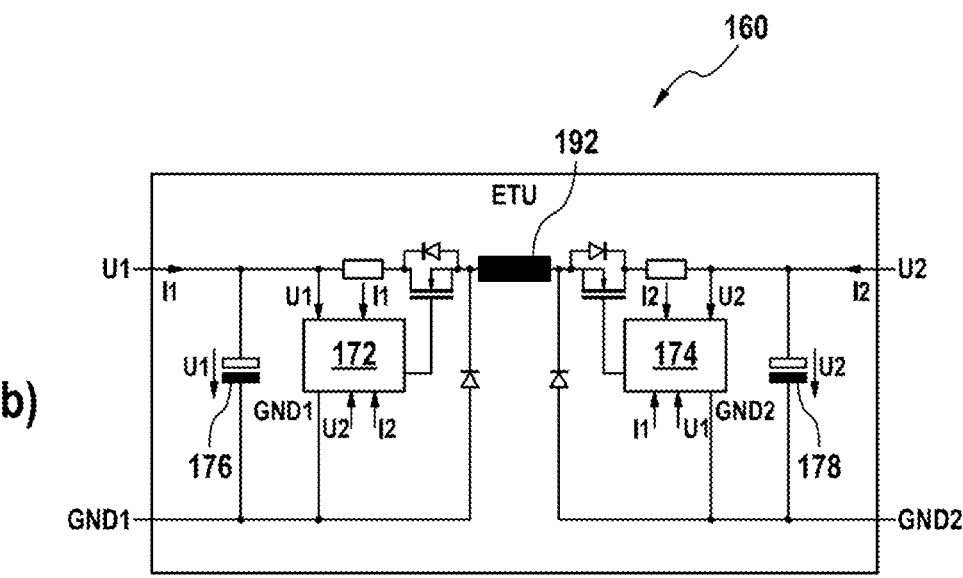

In the variant illustrated in FIG. 6 *a*), two separate electrical circuits 162 and 164 are formed within the energy transmission unit 160, which electrical circuits are connected in each case to one of the plug connectors 166 and 168, respectively, wherein the electrical circuits 162 and 164 are galvanically isolated from one another. For the transmission of energy between the electrical circuits 162 and 164, the energy transmission unit 160 has a transformer 170 with a ferrite core. Furthermore, pulse-width-modulating generators (PWM) 172 and 174 are arranged in each of the electrical circuits 162 and 164, which pulse-width-modulating generators are each configured to, in a manner dependent on the voltages U1 and U2 prevailing in the electrical circuits 162 and 164 and the corresponding current intensities I1 and I2 via the corresponding electrical circuit, transmit energy to precisely that wheel brake whose associated energy source has failed, or to the control unit of said wheel brake.

Capacitors 176 and 178 are connected in each case in parallel with respect to the PWM generators 172 and 174, whilst an output of the PWM generators 172, 174 is connected in each case to the gate connector of a transistor 184, 186 (for example MOSFET) that connects the ferrite core transformer 170 to the respective grounds GND1 and GND2 via downstream elements 180 and 182 for current measurement. Furthermore, the transistors 184 and 186 are in each case connected across a diode 188 and 190 such that switching voltages of the transformer 170 are rectified and are provided to the capacitors 176 and 178.

The energy transmission unit 160 is, owing to its mirror-symmetrical design, capable of both regulating a transmission of energy from the control unit 120 to the control unit 122 and regulating a transmission of energy from the control unit 122 to the control unit 120. The design of the energy transmission unit has the effect of fundamentally ruling out a situation in which both PWM generators 172 and 174 are operated simultaneously. The energy transmission unit 160 may be designed such that no further communication lines are required for the control of the energy transmission unit 160, with the energy transmission unit 160 rather being capable of controlling a transmission of energy between the wheel brakes exclusively on the basis of the values U1, U2, I1 and I2.

The behavior of the energy transmission unit 160 for different input voltages U1 and U2 will be described by way of example below.

In a first scenario, voltages of U1>9 V and U2>9 V prevail respectively at the two inputs of the plug connectors 166 and 168. In this case, the PWM generators 172 and 174 are not activated, such that no energy is transmitted and only a low quiescent current flows within the energy transmission unit 160. The energy transmission unit 160 also exhibits the same behavior if the voltages U1 and U2 are each very low at the two inputs, that is to say both energy sources 116 and 118 exhibit a malfunction, or the associated on-board electrical systems are weak.

However, if a low voltage prevails only at one of the voltage inputs U1 or U2 (for example U1>10 V, U2<9 V), the PWM generator 172 is configured to modulate the voltage prevailing at the ferrite core transformer 170 such that the voltage of at least 9 V that prevails at the connector U2 is held. This regulation may be limited by the currents I1 and I2 insofar as the voltage U2 is held at 9 V only for as long as the current intensity I1<15 A and the current intensity I2 is lower than 20 A. The transmission of energy that is thus limited by the current leads to a power limitation in the range from approximately 150 W to 180 W. In this way, the energy source that is still functioning, or the corresponding on-board electrical system, can be protected against overloading.

The above-described behavior functions inversely if, for example, the voltage U1 is lower than 9 V and the voltage U2 is higher than 10 V.

FIG. 6 *b*) shows an alternative configuration of an energy transmission unit 160 in which, instead of a ferrite core transformer, an inductance 192 is connected in series, such that there is no longer galvanic isolation between the electrical circuits 162 and 164. Here, too, in the event of a voltage drop at one of the inputs U1 or U2, energy required for the operation of the connected wheel brake is provided by the corresponding PWM generators 172 or 174 at the outputs concerned.

Figure 7:
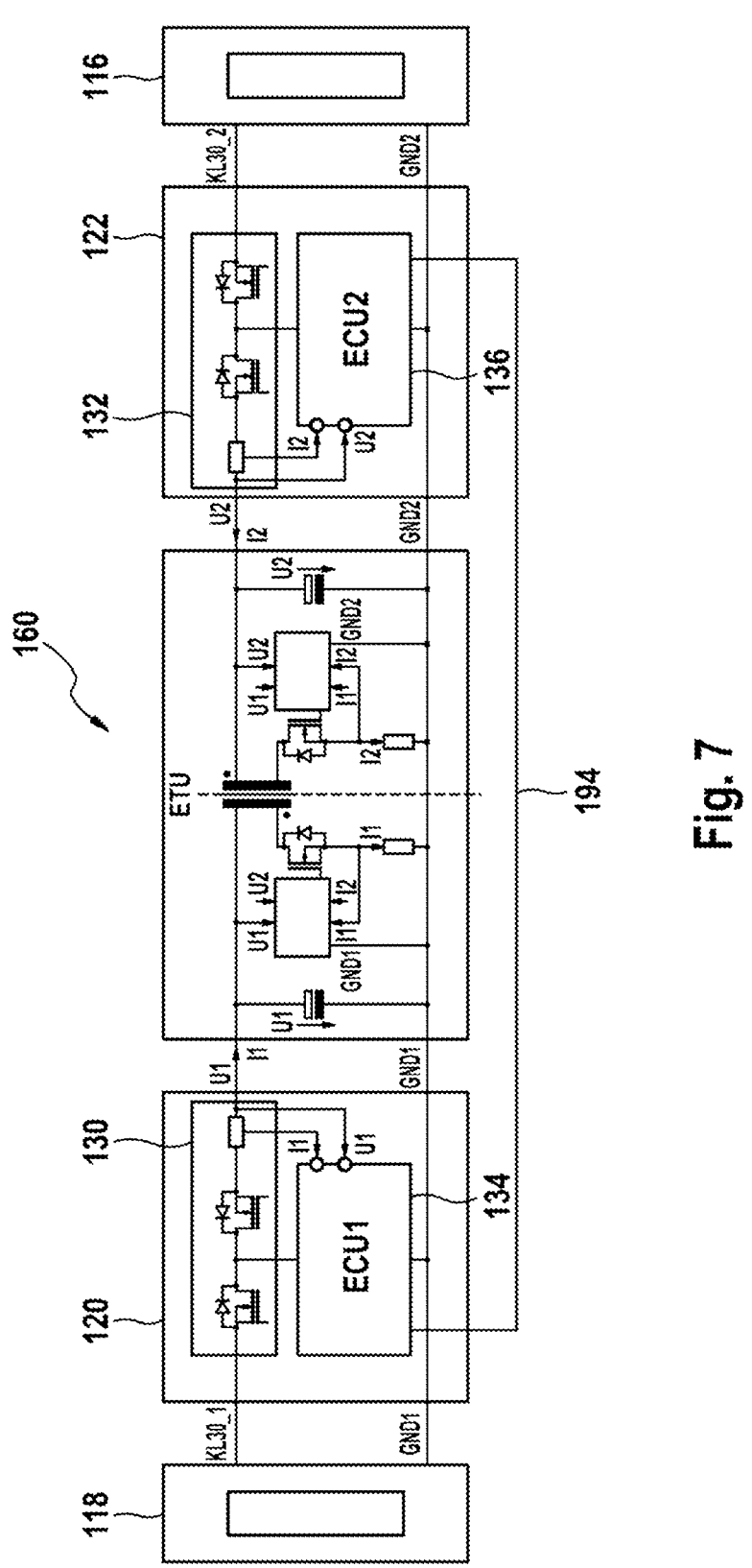
FIG. 7 shows a schematic circuit diagram of an arrangement of energy sources, control units of the wheel brakes and an energy transmission unit.

FIG. 7 shows a schematic circuit diagram of an arrangement of energy sources 118 and 116, control units 120 and 122 of the wheel brakes 108 and 110 and an energy transmission unit 160, which is connected between the control units 120 and 122. In each of the control units, there is provided in each case one current-limiting unit 130 and 132, respectively, which controls the current flow between the control units 120 and 122 in the event of a fault or failure of the respective energy source 116 or 118. The control units 120 and 122 may be configured to exchange information items via a data bus 194, for example in order to check the plausibility of identified fault states, and to react appropriately thereto, inter alia by virtue of connections to the energy sources 116 or 118 being shut off and the supply of energy by the ECU power management 132 and 132 to the energy transmission unit 160 being deactivated.

The described infrastructure with an energy transmission unit 160 arranged in the energy transmission path between the wheel brakes may in principle be provided in each of the variants of a connection between wheel brakes as described above with reference to FIG. 2. For example, provision may also be made whereby the energy transmission unit 160 is arranged between the wheel brakes 112 and 114 of the rear axle of a vehicle, or whereby in each case one energy transmission unit 160 is arranged in the energy transmission path both between the wheel brakes 108 and 110 of the front axle and between the wheel brakes 112 and 114 of the rear axle of a vehicle.

The invention claimed is:

1. A brake system comprising:
at least two energy sources;
at least two electromechanical wheel brakes;
a first wheel brake of the at least two electromechanical wheel brakes directly connected exclusively to a first of the at least two energy sources and indirectly connected to a second of the at least two energy sources;
a second wheel brake of the at least two electromechanical wheel brakes directly connected to the second energy source and indirectly connected to the first energy source; and
wherein in an event of failure of one of the at least two energy sources the other of the at least two energy sources supplies energy to the other wheel brake that is indirectly connected to that energy source;
wherein the wheel brakes each have one first interface for connection to the respective energy source and one second interface for connection to the respective other wheel brake; and
wherein the interfaces to the at least on energy source and the respective other wheel brake are connected separably to the wheel brake via switching devices.

2. The brake system as claimed in claim 1, further comprising at least two power regulating units each associated with at least one of the wheel brakes, wherein in the event of failure of one of the two energy sources the power regulating unit associated with the other at least one wheel brake is configured to control the transmission of energy to the at least one wheel brake associated with the energy source which failed.

3. The brake system as claimed in claim 1, wherein the first wheel brake and the second wheel brake are directly connected to one another via at least one connecting line for the transmission of energy from the respective energy sources.

4. The brake system as claimed in claim 1, wherein the first wheel brake and the second wheel brake are directly connected to one another via two connecting lines for the transmission of energy from the respective energy sources, wherein a first of the connecting lines is configured exclusively to transmit energy from the first wheel brake to the second wheel brake and wherein a second of the connecting lines is configured exclusively to transmit energy from the second wheel brake to the first wheel brake.

5. The brake system as claimed in claim 1, wherein the wheel brakes are connected in each case via one DC converter per interface to at least one of the energy source and the respective other wheel brake.

6. The brake system as claimed in claim 1, wherein the brake system has two brake circuits each having at least two wheel brakes per brake circuit, wherein at least one wheel brake of a first of the brake circuits is directly connected to at least one wheel brake of a second of the brake circuits for the supply of energy in the event of failure of one of the energy sources.

7. The brake system as claimed in claim 6, wherein the brake circuits each have one central control unit for providing control information items for the wheel brakes, wherein in each case at least one of the wheel brakes of one brake circuit is configured to receive and process control information items from a wheel brake of the other brake circuit in the event of failure of the control unit of the brake circuit.

8. The brake system as claimed in claim 1, wherein the brake system has at least one energy transmission unit which is directly connected to each of the first and to the second wheel brake and in the event of failure of one of the energy sources is configured to control the supply of energy to the affected wheel brake by the energy source of the respective other wheel brake.

9. The brake system as claimed in claim 8, wherein in the event of failure of one of the energy sources the energy transmission unit is configured to, supply energy at most with a defined power to that wheel brake which is affected by the failure.

10. The brake system as claimed in claim 8, wherein the energy transmission unit is connected via a first interface to the first wheel brake and via a second interface to the second wheel brake, wherein the energy transmission unit is configured to identify a voltage drop at one of the interfaces and, in reaction to hold the voltage at the corresponding interface at least at a minimum voltage.

11. The brake system as claimed in claim 10, wherein the first interface is spatially separate from the second interface.

12. A brake system comprising:
at least two energy sources;
at least two electromechanical wheel brakes;
a first wheel brake of the at least two electromechanical wheel brakes directly connected exclusively to a first of the at least two energy sources and indirectly connected to a second of the at least two energy sources;
a second wheel brake of the at least two electromechanical wheel brakes directly connected to the second y source and indirect y connected to the first energy source;
wherein in an event of failure of one of the at least two energy sources the other of the at least two energy sources supplies energy to the other wheel brake that is indirectly connected to that energy source;
wherein the brake system has at least one energy transmission unit which is directly connected to each of the first and to the second wheel brake and in the event of failure of one of the energy sources is configured to control the supply of energy to the affected wheel brake by the energy source of the respective wheel brake;
wherein the energy transmission unit is connected via a first interface to the first wheel brake and via a second interface to the second wheel brake, wherein the energy transmission unit is configured to identify a voltage drop at one of the interfaces and, in reaction to hold the voltage at the corresponding interface at least at a minimum voltage; and
wherein the energy transmission unit has a first electrical circuit for providing a voltage at the first interface and a second electrical circuit for providing a voltage at the second interface, wherein the first electrical circuit is galvanically isolated from the second electrical circuit.

13. The brake system as claimed in claim 12, wherein the electrical circuits are each supplied with a voltage from the respective other electrical circuit, in the event of failure of one of the energy sources.

14. A brake system comprising:

at least two energy sources;

at least two electromechanical wheel brakes;

a first wheel brake of the at least two electromechanical wheel brakes directly connected exclusively to a first of the at least two energy sources and indirectly connected to a second of the at least two energy sources;

a second wheel brake of the at least two electromechanical wheel brakes directly connected to the second energy source and indirectly connected to the first energy source;

wherein in an event of failure of one of the at least two energy sources the other of the at least two energy sources supplies energy to the other wheel brake that is indirectly connected to that energy source;

wherein the wheel brakes each have one first interface for plug connection to the respective energy source and one second interface for plug connection to the respective other wheel brake; and wherein the wheel brakes are connected in each case via one DC converter per interface to at least one of the energy source and the respective other wheel brake.

15. The brake system as claimed in claim 14, further comprising at least two power regulating units each associated with at least one of the wheel brakes, wherein in the event of failure of one of the two energy sources the power regulating unit associated with the other at least one wheel brake is configured to control the transmission of energy to the at least one wheel brake associated with the energy source which failed.

16. The brake system as claimed in claim 14, wherein the first wheel brake and the second wheel brake are directly connected to one another via at least one connecting line for the transmission of energy from the respective energy sources.

17. The brake system as claimed in claim 14, wherein the first wheel brake and the second wheel brake are directly connected to one another via two connecting lines for the transmission of energy from the respective energy sources, wherein a first of the connecting lines is configured exclusively to transmit energy from the first wheel brake to the second wheel brake and wherein a second of the connecting lines is configured exclusively to transmit energy from the second wheel brake to the first wheel brake.

18. The brake system as claimed in claim 14, wherein the brake system has two brake circuits each having at least two wheel brakes per brake circuit, wherein at least one wheel brake of a first of the brake circuits is directly connected to at least one wheel brake of a second of the brake circuits for the supply of energy in the event of failure of one of the energy sources.

19. The brake system as claimed in claim 18, wherein the brake circuits each have one central control unit for providing control information items for the wheel brakes, wherein in each case at least one of the wheel brakes of one brake circuit is configured to receive and process control information items from a wheel brake of the other brake circuit in the event of failure of the control unit of the brake circuit.

* * * * *